H. W. BOLENS.
DRIVING MECHANISM.
APPLICATION FILED MAY 26, 1911.
1,096,888.
Patented May 19, 1914.
2 SHEETS—SHEET 2.
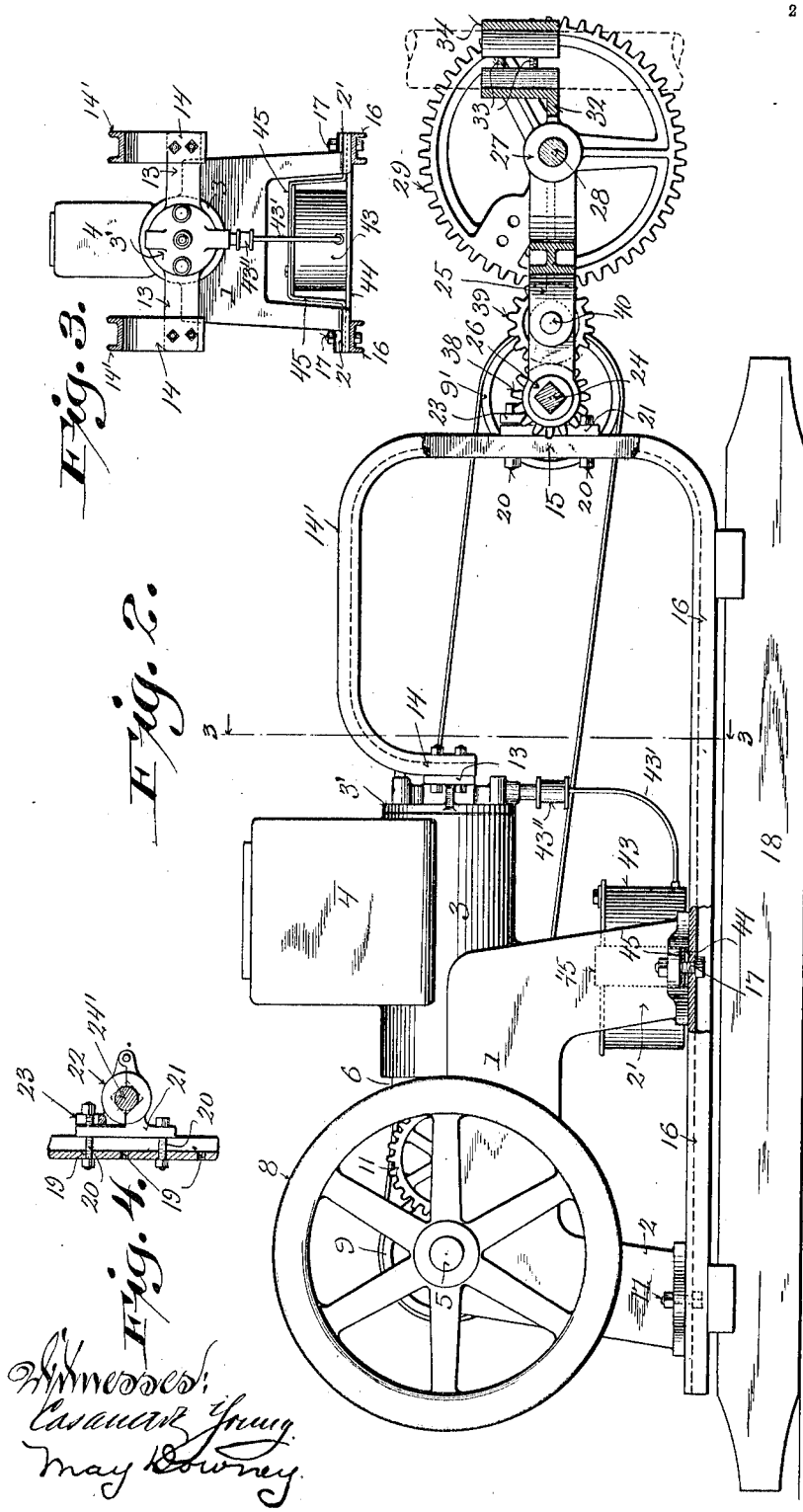

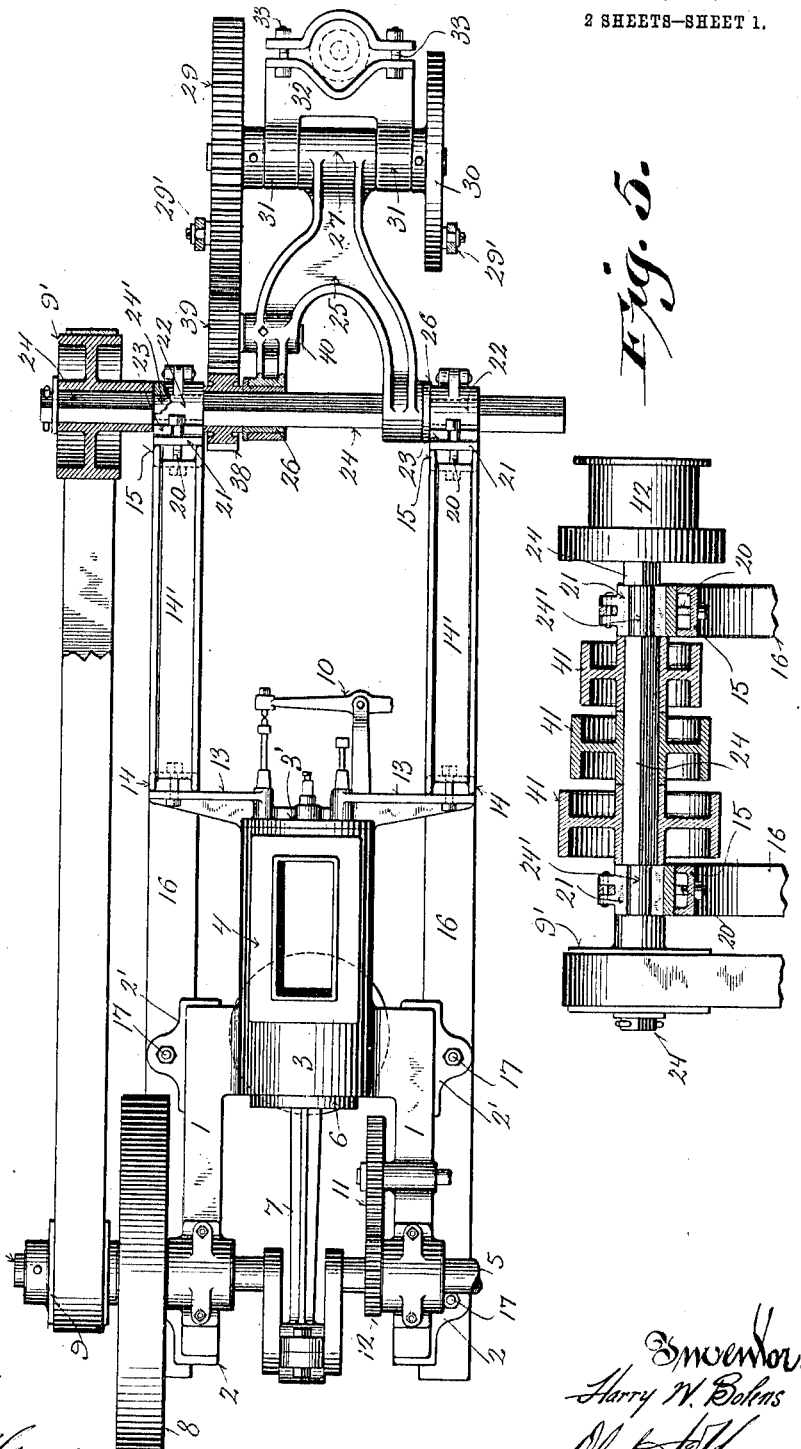

UNITED STATES PATENT OFFICE.

HARRY W. BOLENS, OF PORT WASHINGTON, WISCONSIN.

DRIVING MECHANISM.

1,096,888. Specification of Letters Patent. Patented May 19, 1914.

Application filed May 26, 1911. Serial No. 629,691.

*To all whom it may concern:*

Be it known that I, HARRY W. BOLENS, a citizen of the United States, and resident of Port Washington, in the county of Ozaukee and State of Wisconsin, have invented certain new and useful Improvements in Driving Mechanism; and I do hereby declare that the following is a full, clear, and exact description thereof.

My invention has for its object to provide simple, effective portable transmission gearing and frame therefor, its construction and arrangement being such that power may be applied through a suitably supported counter-shaft to various machine elements in juxtaposition to which the frame is temporarily located.

One specific object of my invention is to provide a skeleton frame for the support of a counter-shaft, the frame comprising parallel looped struts each having an end rigidly secured to the base of an engine body with their opposite ends attached to the cylinder head of such engine body, whereby a compact, rigid connection between the crank-shaft and counter-shaft is effected, which counter-shaft is disposed rearward of the cylinder while the power or crank shaft is located in the usual forward position relative thereto. The above arrangement of supporting frame for the gearing thus forms a rigid tie between the drive and driven shafts whereby a fixed relation is maintained.

Another object of my invention is to provide a counter-shaft that is rectangular in cross-section for convenience in assembling various interchangeable sets of gearing of either pulley or toothed gear type, the hub of the gear-members being provided with rectangular bores to conform to the shaft whereby the same are in rotatable union therewith.

With the above objects in view my invention consists in what is herein shown, described and claimed.

In the drawings Figure 1 represents a plan view of an internal combustion engine provided with a gear transmission attachment embodying the features of my invention, parts being broken away and parts in section to more clearly illustrate certain structural features; Fig. 2, a side elevation of the same with parts broken away and parts in section; Fig. 3, a cross-section of the engine, the section being indicated by line 3—3 of Fig. 2; Fig. 4, a detail sectional view of one of the supporting bearings of a counter-shaft, and Fig. 5, a detail plan view illustrating the counter-shaft equipped with a transmission gearing in the form of a series of stepped pulleys that may be substituted for the toothed gearing illustrated in connection with the counter-shaft in Fig. 1.

Referring by characters to the drawings, 1 represents an engine base provided with feet 2, 2', to which base is secured the cylinder 3 provided with upwardly extending walls forming an open mouth water-cooling tank 4. Mounted upon the base 1 is the usual crank-shaft 5 that is connected to a piston 6 by a pitman 7. The crank-shaft is also provided with a fly-wheel 8 and a driving wheel 9 in the form of a pulley. The engine cylinder 3 is also provided with a detachable cylinder head 3' carrying a standard valve mechanism 10 that is under cam control, not shown, the same being driven by a gear-wheel 11 from the crank-shaft through a pinion 12 carried thereby. The above described engine is of a well known type and forms no part of my invention, with the exception that the body thereof constitutes a part of a portable frame that carries the transmission gearing.

The cylinder head 3' is provided with apertured ears 13 that extend laterally in either direction therefrom, to which ears are attached the downturned ends 14 of upper stretches 14' that form part of a pair of longitudinal struts, the downturned ends being secured to the ears 13 by suitable bolts. The struts comprise one-piece parallel loops having vertically disposed stretches 15 and bottom stretches 16 that extend under the feet of the engine base and are secured thereto by bolts 17. The vertical stretches 15 of the struts are disposed rearwardly of the engine cylinder and in the opposite direction to which power is applied to the crank-shaft. The struts are each preferably bent up from a piece of U-shaped angle iron, their bottom stretches 16 being supported upon longitudinal skids 18.

The vertical stretch 15 of each strut is provided with a series of apertures 19 for the reception of retaining bolts 20 of a supporting member 21 of a two-part box. The cap-member 22 of each box is hinged to the supporting member and has a slotted flange 23 for engagement with one of the retaining bolts 20 whereby said cap-member is secured. A counter-shaft 24 is journaled in the boxes, the same being rectangular in cross-section and provided with turned cylindrical sections 24' that are mounted within said boxes.

The counter-shaft, as shown in Figs. 1 and 2, carries a pulley 9' at one end that is in belt gear connection with the crank-shaft pulley 9, the said counter-shaft pulley being provided with a squared bore for engagement with the squared shaft end whereby said pulley is held in rotative engagement with the shaft. A hanger 25 is provided with boxes at one end thereof that are journaled upon bushings 26 mounted upon the counter-shaft whereby said hanger is suspended thereabout, the bushings being provided with squared bores and adapted to rotate with the counter-shaft 24. The opposite end of the hanger carries a single box 27 into which is journaled an arbor 28 having a gear-wheel 29 secured to one end and a disk 30 secured to the opposite end thereof. The hanger-arbor is also rotatably mounted in journal bearings 31 of a bifurcated clip 32, the inner faces of which clip-bearings abut the opposite ends of the hanger-box 27, whereby a hinged connection is formed about said arbor relative to the clip and hanger. The clip 32 has an apertured flange for the reception of retaining bolts 33 that engage a saddle member 34, the same being provided for convenient attachment of the clip to a pump column or other machine element as indicated by dotted lines in Figs. 1 and 2. Both the gear wheel 29 and disk 30 carry crank-pins 29' for connection with suitable pitmen that may be linked to a pump-piston or other reciprocative mechanical element not shown.

The counter-shaft carries a toothed pinion 38 which imparts rotation to the gear-wheel 29 through an interposed idle pinion 39, the same being journaled upon a stud 40 that is carried by the hanger 25. The clip 32, gear-wheel 29 and disk 30 with their various connections constitute a pump-jack comprising one means whereby the engine can be readily coupled to a pump or other mechanical element to which reciprocative power is to be applied, and, as previously stated, the hanger 25 being in hinge connection with the counter-shaft and arbor, this movement permits ample scope for vertical adjustment as to elevation of the gearing.

The split journal-boxes of the counter-shaft may be adjusted to various elevations and secured in their adjusted position by the retaining bolts 20 that are fitted into any one of the separate sets of strut apertures.

The idle pinion 39 through which power is transmitted from the power shaft to the gear-wheel 29 is inserted for the purpose of overcoming the reverse drive of the said gear-wheel which would otherwise occur should the same be directly meshed with the counter-shaft pinion 38, it being understood that, in some instances, the idle pinion may be dispensed with. It is also obvious that any suitable form of gearing other than that shown may be employed to transmit power from the counter-shaft to the crank-shaft and from thence to the machine element.

When it is desired to supplement the toothed driving gear illustrated in Figs. 1 and 2 for a belt drive, the squared counter-shaft is removed from its journal-boxes and stripped of the hanger 25 and its gear connections. As shown in Fig. 5, the counter-shaft is then equipped with a series of stepped pulleys 41, the hubs of which are provided with squared bores whereby they may be quickly assembled in their respective order and are thus rendered capable of being rotated with the shaft without resorting to keys or other securing means, this change of gear being readily effected by those unskilled in the art of mechanics by simply sliding the pulley or driving members into position. After the pulleys are assembled the shaft can be dropped into the split boxes and secured in the manner previously described, there being a clutch pulley 42 connected to one end of the counter-shaft whereby rotatory power therefrom may be transmitted to a separator or any machine element requiring power in a continuous rotary form.

A convenient means for attaching the fuel tank 43 is illustrated in Figs. 2 and 3 of the drawings, which means comprises a transversely disposed strap 44, the ends of which are interposed between the engine base feet 2' and the stretches 16 of the struts upon which strap the tank is supported. The ends of a second transversely disposed strap 45 are also nested over the first mentioned straps and interposed between the engine base feet and strut stretches 16. This strap is in the form of an inverted U and extends over the top of the tank whereby the same is securely held in position between the engine base feet 2' which straddle the same as best shown in Fig. 3. The tank is connected by a suitable feed-pipe 43' to the carbureter 43''. The ends of the straps 44 and 45 are secured by the bolts 17 which pass therethrough, but it is understood that, in some instances, the said ends may be held by a frictional grip between the engine base feet and stretches 16 of the struts, the friction grip being obtained by the clamping engagement effected through the bolts 17.

I claim:

1. A transmission mechanism comprising a frame, a drive-shaft mounted in one end thereof, a squared counter-shaft journaled at the opposite end of the frame, gear members having squared bored hubs fitted to the counter-shaft, a driving connection between one of said gear-members and drive-shaft, bushings fitted to said counter-shaft, a hanger journaled upon the bushings, and a gear-train carried by the hanger, one of its members being in meshed engagement with one of the counter-shaft gear members.

2. A transmission mechanism comprising a frame, a drive-shaft mounted in one end thereof, a squared counter-shaft journaled at the opposite end of the frame, gear members having squared bored hubs fitted to the counter-shaft, a driving connection between one of said gear members and drive-shaft, bushings fitted to said counter-shaft, a hanger journaled upon the bushings, a gear-train carried by the hanger having one of its members in mesh with one of the counter-shaft gear members, and means in connection with the free end of the hanger for attachment to a fixed machine element.

3. A transmission mechanism comprising a frame, a drive-shaft journaled at one end of the frame, a squared counter-shaft journaled at the opposite end of said frame, the said counter-shaft being in belt gear connection with the drive shaft, a hanger loosely mounted upon the counter-shaft, a gear member having a squared bored hub fitted to said counter-shaft, and other gear means carried by the hanger in driving engagement with the squared shaft gear member.

4. A transmission mechanism comprising a frame, a squared shaft journaled therein, a gear member having a squared bored hub mounted upon the shaft, a hanger provided with boxes that engage the shaft, a box carried by said hanger at its opposite end, an arbor mounted in the box, a bifurcated clip mounted about the arbor, means for attaching the clip to a machine element, and a gear train carried by the hanger, one gear of the train being in driving connection with the squared shaft gear member.

In testimony that I claim the foregoing I have hereunto set my hand at Milwaukee in the county of Milwaukee and State of Wisconsin in the presence of two witnesses.

HARRY W. BOLENS.

Witnesses:
   Geo. W. Young,
   May Downey.

---

Copies of this patent may be obtained for five cents each, by addressing the "Commissioner of Patents, Washington, D. C."